United States Patent

Sergin (10) Patent No.: US 9,556,832 B1
(45) Date of Patent: Jan. 31, 2017

(54) ADIABATIC FUEL INJECTION-IGNITION METHOD AND DEVICE

(71) Applicant: COMBUSTION ENGINE TECHNOLOGIES, LLC, Lompoc, CA (US)

(72) Inventor: Alexander Sergin, Lompoc, CA (US)

(73) Assignee: Combustion Engine Technologies, LLC, Lompoc, CA (US)

(\*) Notice: Subject to any disclaimer, the term of this patent is extended or adjusted under 35 U.S.C. 154(b) by 0 days.

(21) Appl. No.: 14/842,131

(22) Filed: Sep. 1, 2015

(51) Int. Cl.
*F02M 31/14* (2006.01)
*F02M 31/18* (2006.01)
*F02D 41/38* (2006.01)
*F02D 41/40* (2006.01)

(52) U.S. Cl.
CPC ........ *F02M 31/145* (2013.01); *F02D 41/3827* (2013.01); *F02D 41/401* (2013.01); *F02M 31/18* (2013.01)

(58) Field of Classification Search
CPC .. F02M 31/145; F02M 31/18; F02M 21/0281; F02M 25/03; F02M 25/038; F02M 35/1227; F02M 35/1233; F02M 2700/43521; F02M 15/025; F02M 15/027; F02M 21/02; F02M 31/04; F02M 31/14; F02M 31/163; F02D 41/38257; F02D 41/401
USPC ............ 123/220, 41.14, 543, 545, 547, 553, 554, 123/558
See application file for complete search history.

(56) References Cited

U.S. PATENT DOCUMENTS

| 1,988,309 | A | | 1/1935 | Ford |
| 2,033,810 | A | * | 3/1936 | Bernard .................. F02B 19/04 123/261 |
| 2,413,343 | A | | 12/1946 | Toce et al. |
| 2,662,510 | A | | 12/1953 | French |
| 2,744,507 | A | | 5/1956 | Huber |
| 3,496,919 | A | | 2/1970 | Gerrard |
| 4,178,903 | A | * | 12/1979 | Yanagihara ......... F02B 19/1085 123/259 |
| 4,359,017 | A | | 11/1982 | May |

(Continued)

FOREIGN PATENT DOCUMENTS

DE   102009015905 A1   10/2010
GB          682496 A   11/1952

*Primary Examiner* — Hung Q Nguyen
*Assistant Examiner* — Brian P Monahon
(74) *Attorney, Agent, or Firm* — Felix L. Fischer (57) ABSTRACT

An internal combustion engine having a combustion chamber incorporates a fuel conditioner and injector employs a vessel having a wall exposed within the combustion chamber to be heated by combusting fuel. The vessel encompasses an expansion chamber and has at least one open fuel injection passage through the wall into combustion chamber. An inlet conduit receives liquid fuel at a predetermined pressure from a fuel delivery system. A nozzle interconnects the inlet conduit and the expansion chamber. A pin operably seals the nozzle for timed injection of liquid fuel into the expansion chamber. An operator actuates the pin from a closed position sealing the nozzle to an open position placing the fuel injection volume in fluid communication with the expansion chamber. Liquid fuel injected into the expansion chamber at a predetermined time is simultaneously adiabatically heated, and pressurized to a state above a critical point using heat in the vessel wall and self-injects through the at least one open fuel injection passage into the combustion chamber of the engine.

17 Claims, 8 Drawing Sheets

(56) References Cited

U.S. PATENT DOCUMENTS

| | | | |
|---|---|---|---|
| 4,399,778 A | 8/1983 | Ancheta | |
| 4,445,485 A | 5/1984 | Chamness, Jr. | |
| 4,458,654 A | 7/1984 | Tuckey | |
| 4,506,647 A | 3/1985 | Geddes et al. | |
| 4,637,365 A | 1/1987 | Yunick | |
| 4,644,925 A * | 2/1987 | Hoppie | F02M 27/02 |
| | | | 123/557 |
| 4,738,227 A * | 4/1988 | Kamo | F02B 9/04 |
| | | | 123/23 |
| 4,875,444 A * | 10/1989 | Tsuchida | F02B 19/165 |
| | | | 123/270 |
| 4,944,262 A * | 7/1990 | Molina | F01L 7/10 |
| | | | 123/151 |
| 5,054,443 A * | 10/1991 | Kawamura | F02B 19/02 |
| | | | 123/254 |
| 5,060,609 A * | 10/1991 | Merritt | F02B 33/14 |
| | | | 123/256 |
| 5,078,107 A | 1/1992 | Morikawa | |
| 5,454,356 A * | 10/1995 | Kawamura | F01L 3/20 |
| | | | 123/254 |
| 5,678,517 A * | 10/1997 | Chen | F02B 19/1009 |
| | | | 123/263 |
| 5,799,629 A | 9/1998 | Lowi, Jr. | |
| 5,832,880 A | 11/1998 | Dickey | |
| 5,870,992 A | 2/1999 | Kamura et al. | |
| 5,887,566 A * | 3/1999 | Glauber | F02D 19/105 |
| | | | 123/27 GE |
| 6,062,189 A | 5/2000 | Kaneko et al. | |
| 6,089,195 A | 7/2000 | Lowi, Jr. | |
| 6,182,632 B1 | 2/2001 | Yanagihara | |
| 8,095,294 B1 * | 1/2012 | Griffiths | F02D 35/024 |
| | | | 123/525 |
| 8,635,985 B2 | 1/2014 | McAlister | |
| 2004/0103858 A1 | 6/2004 | Shetley | |
| 2006/0016403 A1 * | 1/2006 | Gurin | B01F 3/04468 |
| | | | 123/1 A |
| 2006/0123788 A1 * | 6/2006 | Gobert | F01D 5/048 |
| | | | 60/612 |
| 2007/0227493 A1 * | 10/2007 | Cheiky | F02M 27/02 |
| | | | 123/304 |
| 2009/0183710 A1 * | 7/2009 | Philberth | F01L 1/38 |
| | | | 123/268 |
| 2012/0118262 A1 * | 5/2012 | Johnson | F02B 19/1009 |
| | | | 123/260 |
| 2013/0000596 A1 * | 1/2013 | Diaz Escano | F02B 17/005 |
| | | | 123/25 A |
| 2013/0340710 A1 | 12/2013 | Fukuyama et al. | |
| 2014/0048046 A1 * | 2/2014 | Saeki | F02D 41/403 |
| | | | 123/478 |
| 2014/0209057 A1 * | 7/2014 | Pouring | F02B 19/12 |
| | | | 123/257 |
| 2014/0263697 A1 | 9/2014 | McAlister | |
| 2014/0345563 A1 | 11/2014 | McAlister | |

* cited by examiner

ADIABATIC FUEL INJECTION-IGNITION METHOD AND DEVICE

BACKGROUND

Field of the Invention

The embodiments disclosed herein relate generally to fuel systems for an any internal combustion engines and more particularly to a fuel conditioning and injection system employing a volume in contact with combustion temperatures for adiabatic heating of fuel pumped into the chamber at a fuel rail pressure to high pressure and temperature and conversion of at least a portion of the fuel into more highly energized radical molecules for self-injection through open orifices into the combustion chamber of the engine. The open orifices allow partial oxidation of the fuel charge during adiabatic heating for formation of radicals improving combustion performance.

References to Related Art

Internal combustion engines, and more particularly compression-ignition engines, also known as a Diesel cycle engines, perform at maximum output and efficiency when the maximum combustion pressure occurs in a desired rotation range of the engine crank shaft somewhere between 20 and 30 degrees after top dead center (TDC) down in the working cycle. There is a measurable time lag between the point of fuel injection into the combustion chamber and combustion occurring, which is known as ignition delay. Fuel must be injected earlier to have time to ignite and combust developing maximum pressure at the desired rotation range. In most compression-ignition engines the fuel is injected into combustion chamber and starts raising pressure in the combustion chamber before the engine has completed the compression cycle, which is necessary to obtain the peak combustion pressure in the desired rotation range. This negatively affects life of the engine due to overloading and also produces noise known as "knock". In these engines, if fuel was injected after the compression cycle to eliminate the knock, then maximum combustion pressure will develop at greater than the desired 20-30 degrees of working cycle of the crank shaft, wasting combustion energy through the exhaust cycle and resulting in output and efficiency losses. Alternatively, the engine can be switched to a different fuel quality or cetane number to reduce ignition delay.

It is known in the prior art that compression-ignition engines working on gasoline are far more efficient compared to gasoline powered Otto cycle engines. However, such engines produce a power output only about 75% of an Otto cycle engine of equal displacement. Prior art compression-ignition engines do not provide homogeneous mixture of fuel with oxidizing atmosphere prior to combustion, and the greater amount of fuel after a certain level being injected into the engine creates incomplete fuel burn, resulting in unacceptable emission levels.

It is also known that higher efficiency can be obtained by conditioning fuel to a high energy state prior to introduction into the combustion chamber of the engine, and more particularly preheating, pressurizing and partially oxidizing the fuel to a vapor and above a critical state with an optimal ratio of fuel molecules in radical formation. It has been well established that only molecules in radical formation ignite and combust and that ignition delay is the time interval between introduction of the fuel into an oxidizing atmosphere, fuel transformation in several states to form radicals and initial oxidation of the radicals that is combustion. Parameters affecting transformation of the fuel molecules to formation of the radicals are heating the fuel to the temperature exceeding 1000 F. with initial pressure applied, or heating the fuel molecules above critical temperature and critical pressure for particular type of fuel with partially oxidation. The ignition and following combustion occurring from oxidizing fuel radicals in high concentration of oxygen constituting the combustion event is independent from the temperature of the oxidizer. Somewhat different from pure compression-ignition engines, this type of engine operation is called injection-ignition. It has also been found that radicals have four times higher ability to mix with oxidizer, providing a more homogeneous mixture and providing ability to increase power density of an engine.

It is therefore desirable to provide a conditioner and injector system for engines to have a negligible ignition delay where fuel can be injected after the compression cycle with combustion maximum pressure reached between 20 and 30 degrees after piston TDC down in the working cycle main operating shaft rotation with the engine performing at a maximum efficiency without knock. It is also desirable to provide a greater power density of the compression-ignition engines, for a particular engine displacement with any desired type of fuel and that engine displacement can be reduced with engine output requirements leading to reduce fuel consumption, reduced engine dimensions and weight thereby lowering manufacturing cost. It is also advantageous for the engine to have homogeneous mixture of fuel with oxidizing atmosphere prior combustion. It is still further advantageous for the conditioner and injector system to introduce fuel into the combustion chamber of the engine above critical state with an optimum level of radicals, instead of a liquid form at an engine environmental temperatures, thereby providing a greatly reduction ignition delay and increasing thermal efficiency of the combustion.

SUMMARY OF THE INVENTION

The embodiments disclosed herein provide a fuel conditioner and injector for an internal combustion engine having a combustion chamber. The fuel conditioner and injector employs a vessel having a wall exposed within the combustion chamber to be heated by combusting fuel. The vessel encompasses an expansion chamber and has at least one open fuel injection passage through the wall into the combustion chamber. An upper body having an inlet conduit receives liquid fuel at a predetermined pressure from a fuel delivery system. A nozzle interconnects the inlet conduit and the expansion chamber. A pin operably seals the nozzle for timed injection of liquid fuel into the expansion chamber. An operator actuates the pin from a closed position sealing the nozzle to an open position placing the fuel injection volume in fluid communication with the expansion chamber. Liquid fuel injected into the expansion chamber is adiabatically conditioned to above a critical point using heat in the vessel wall and self-injects through the at least one open fuel injection passage into the combustion chamber of the engine.

DETAILED DESCRIPTION

The embodiments disclosed herein provide a fuel conditioner and injector device which uses combustion heat energy for adiabatically heating and pressurizing a liquid fuel to above a critical point from a lower temperature and pressure of a liquid fuel delivery system prior to fuel entry into a combustion chamber of the engine. This process is referred to herein generally as "conditioning" of the fuel. An inlet injector includes a body receiving fuel under pressure from the fuel delivery system. Fuel is injected from the body through at least one liquid fuel inlet passage into a vessel having an expansion chamber. The liquid fuel flow is controlled by a conventionally activated valve as known in the prior art. The vessel has an exterior surface which is exposed within the combustion chamber and has an expansion chamber with the ability to withstand high pressure and high temperature. The vessel absorbs combustion heat through the exterior surface with heat transfer to the vessel inner surface surrounding the expansion chamber. Injected liquid fuel introduced into expansion chamber absorbs heat energy from the inner surface and is transformed from a liquid phase into a high temperature and pressure phase above the critical point for the fuel inside the expansion chamber of the vessel. The vessel incorporates at least one open fuel injection passage from the expansion chamber into the combustion chamber and conditioned fuel under increasing pressure in the expansion chamber is automatically injected ("self-injected") into the combustion chamber. The size of the open fuel injection passages or an orifice within the passages allows entry of oxygen rich charge air (and/or other supplemented oxidizer) from the compression cycle of the engine and constrains the exiting fuel flow for a desired flow time. During the adiabatic heating and pressurization process, injection of a compressed oxidizing atmosphere from the oxidizer charge being compressed in the engine into the expansion chamber from the combustion chamber through the open fuel injection passages results in partial oxidation of the fuel. The combination of heating of the fuel charge in the expansion chamber above the critical point by continuing absorption of heat from the vessel creates radicals in a portion of the fuel molecules with a higher energy state in the fuel charge. Partial oxidation of the fuel in creating the radicals in the fuel molecules releases internal energy in the heated fuel conditioned in the expansion chamber. In the exemplary embodiments sizing of the total area of the open fuel injection passages is predetermined for admitting sufficient oxidizer charge into the expansion chamber to induce formation of a small percentage of radicals without diluting the following combustion rate with up to 5% of the total fuel charge converted to radicals in the conditioned fuel for enhanced combustion in the exemplary embodiment. The conditioned fuel with the converted radicals is defined herein as a "hyper fuel state". In alternative embodiments, injection through the fuel injection passage may be controlled by a secondary valve operating independently from the valve in the injector body to adjust timing of injection flow. The present invention is provides reduction in ignition delay and improves quality of the combustion process, which ultimately leads to increases in fuel efficiency and reduction of harmful emissions of the combustion engine.

Figure 1A:
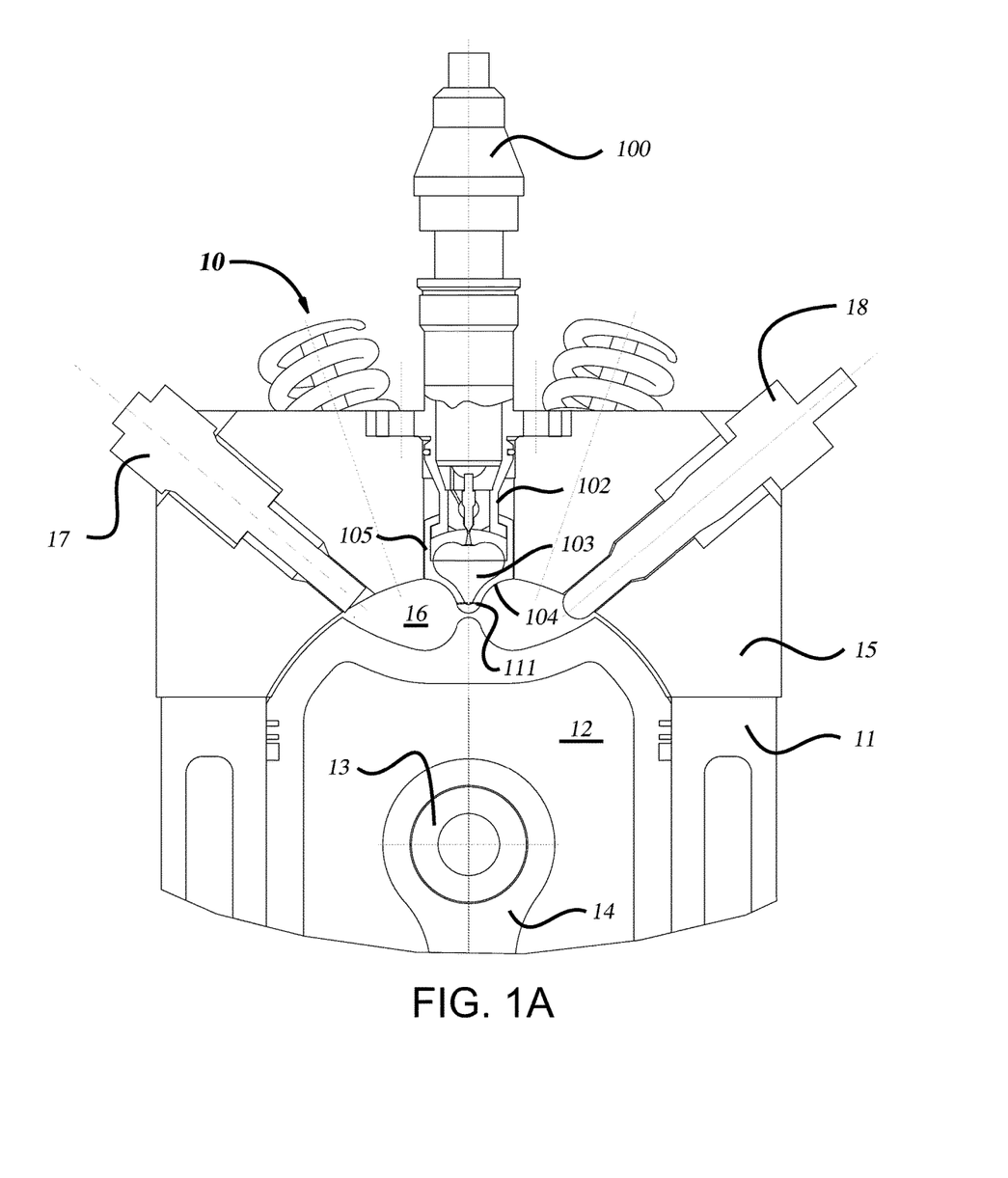
FIG. 1A is a fragmentary side section view of a piston-reciprocating internal combustion engine with the piston position at a top dead center, showing an exemplary embodiment of the fuel conditioner and injector device.
Figure 2:
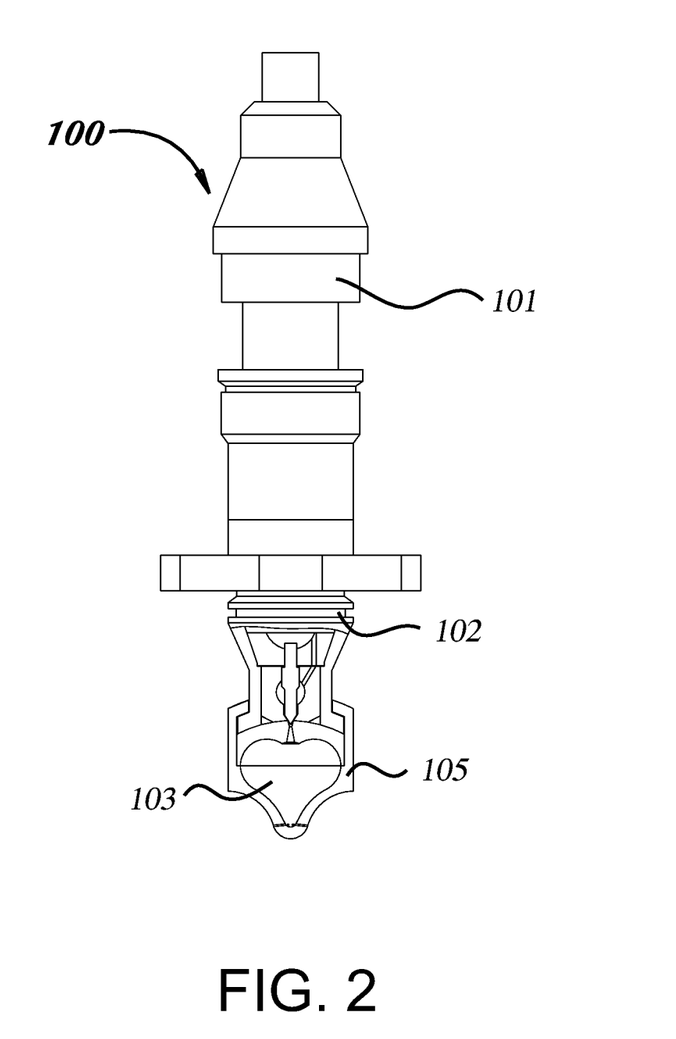
FIG. 2 is a simplified elevation view of an exterior of the fuel conditioner and injector device with a fragmentary sectional view of the injector valve and vessel with the expansion chamber for the embodiment of FIG. 1A.
Figure 3:
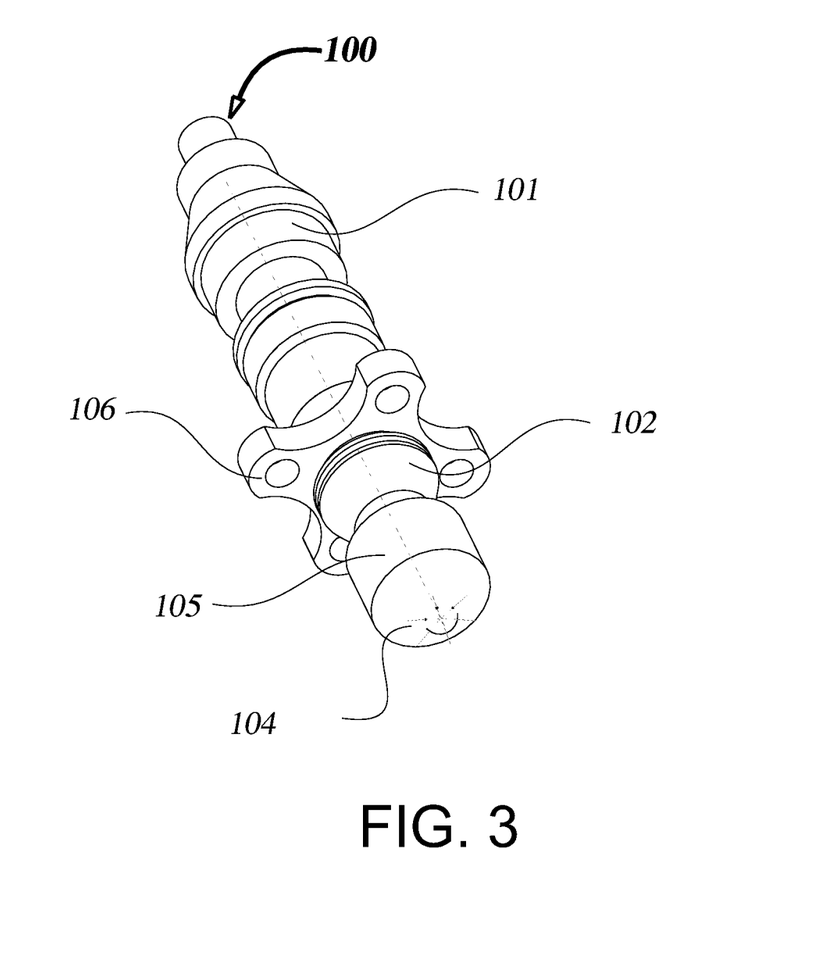
FIG. 3 is an isometric view of the fuel conditioner and injector device.

Referring to the drawings, FIG. 1A illustrates as a first example an engine 10 employing an exemplary embodiment of the fuel conditioner and injector device. The engine 10 incorporates a cylinder 11 in which a piston 12 reciprocates on a piston pin 13 driving a connecting rod 14 conventionally attached to a crank shaft (not shown). A cylinder head 15 closes the cylinder 11 and provides a combustion chamber 16. The fuel conditioner and injector device 100 is received in the cylinder head 15. While shown as a separate integrated element portions of the conditioner and injector device 100 may be machined into or otherwise integrated with the cylinder head 15. As also seen in FIGS. 2-3, the fuel conditioner and injector device 100 includes an upper portion 101 which incorporates actuating elements and connection to the liquid fuel delivery system as will be described in greater detail subsequently. A lower portion 102 has a vessel 105 having at least a portion of an exterior wall 104 as a heat absorbing surface exposed within the combustion chamber 16.

Figure 4:
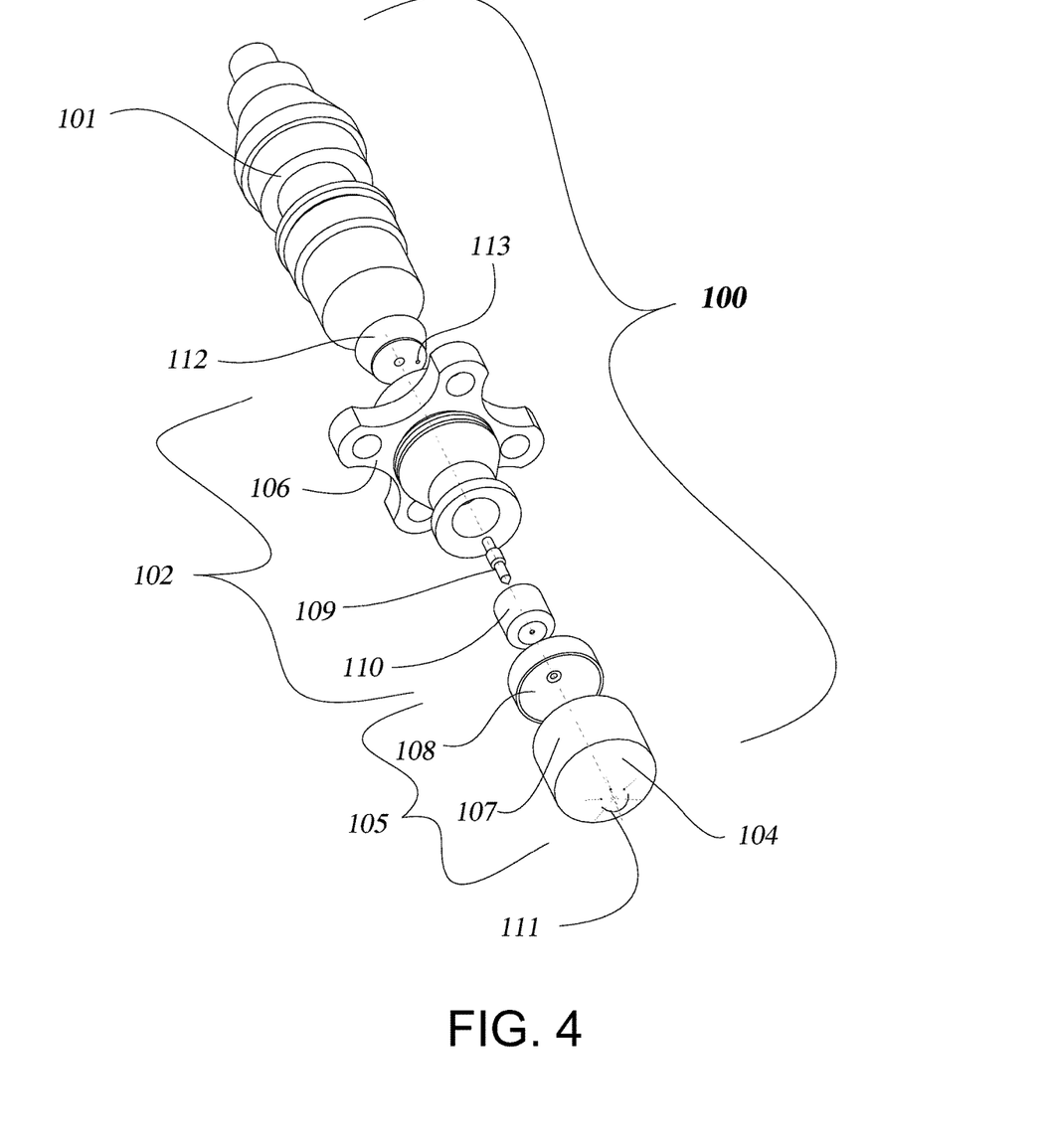
FIG. 4 is an exploded isometric view of the fuel conditioner and injector device.
Figure 5:
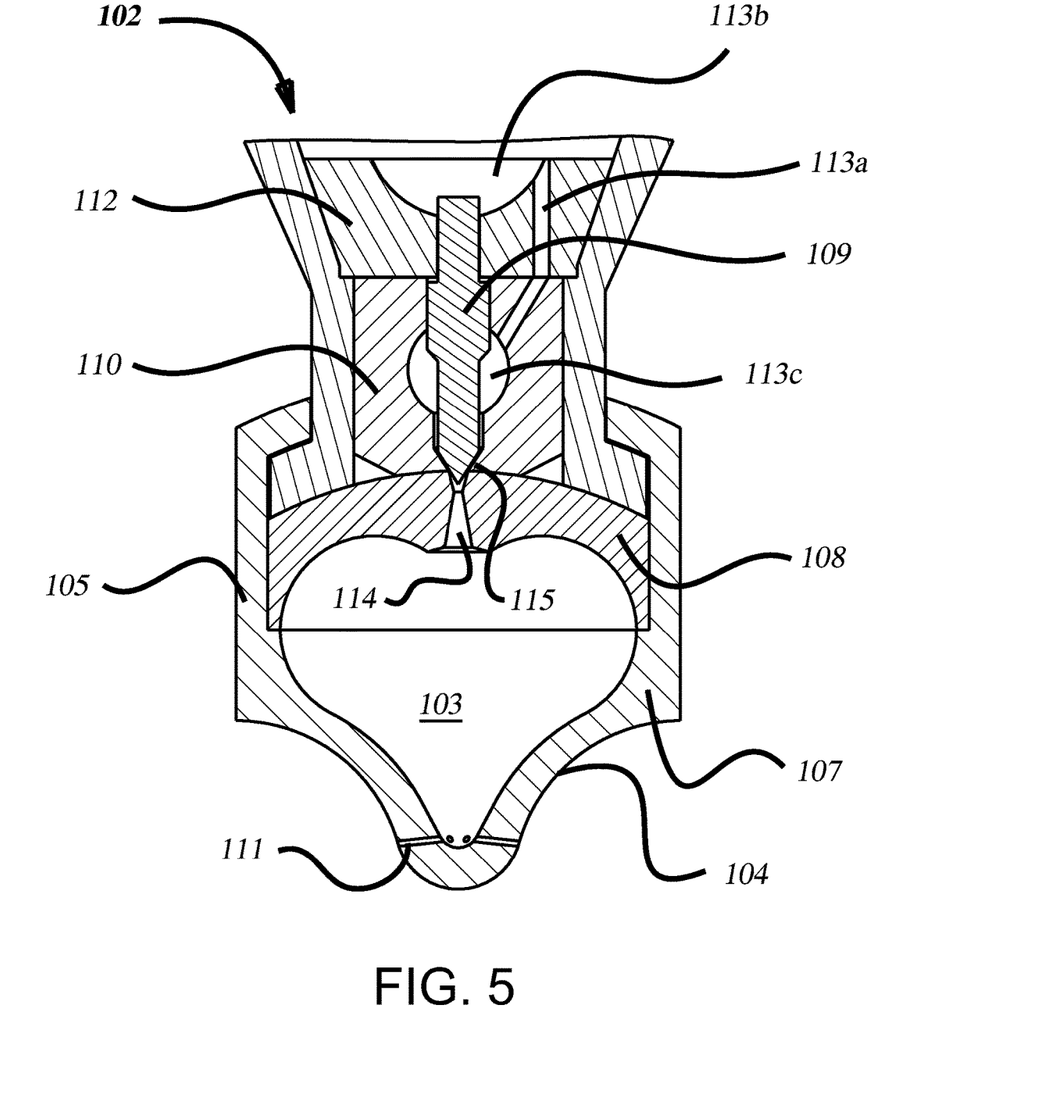
FIG. 5 is an enlarged side section view of the injector valve and vessel of the fuel conditioner and injector device shown in FIG. 2.

As seen in FIGS. 4 and 5, an expansion chamber 103 in the vessel 105 is formed in an exemplary embodiment by a lower portion 107 and a cap 108 integrated in the conditioner and injector device. In alternative embodiments, the vessel 105 may be a separate element or may be machined into the cylinder head 15. A pin 109 is constrained in a lower body 110 with an upper body 112. Liquid fuel from the fuel delivery system flows through an inlet conduit formed in the exemplary embodiment by a fuel inlet passage 113*a* from a fuel gallery 113*b* into a fuel injection volume 113*c*. The pin 109 operably seals a liquid fuel inlet nozzle 114 in the cap 108 which is in fluid communication between the fuel injection volume 113*c* and the expansion chamber 103. A seat 115 in the fuel inlet nozzle allows a mating seal with the pin 109. Open fuel injection passages 111 extend through the wall 104 from the expansion chamber 103 into the combustion chamber 16.

The lower portion 107 of the vessel 105 and the exterior wall 104 are shaped to provide desired amount of absorption of heat from the combustion chamber 16 during operation of the engine 10 and transfer of that heat for adiabatic pressurization of a fuel charge provided through the inlet nozzle 114. The vessel 105 and exposed wall 104 are centrally located in the combustion chamber 16 for even distribution of conditioned fuel through the open fuel injection passages 111 into the combustion chamber. The vessel 105 as a whole or the lower portion 107 may be fabricated from titanium for high thermal efficiency and strength. For the embodiment shown lower portion 107 and exterior wall 104 constitute a rounded nipple extending into the combustion chamber 16. In alternative embodiments a hemispherical shape or other geometric protrusion may be employed. The interior expansion chamber 103 of the vessel 105 is shaped with a torus in the cap 108 blending into substantially a cone shape in the lower portion 107 to enhance mixing of the fuel injected into the expansion chamber through inlet nozzle 114. Fuel injected into the cone shape is reflected upwards into the torus shape which then recirculates the fuel charge creating mixing within the entire expansion chamber to facilitate conditioning of the fuel.

Figure 1B:
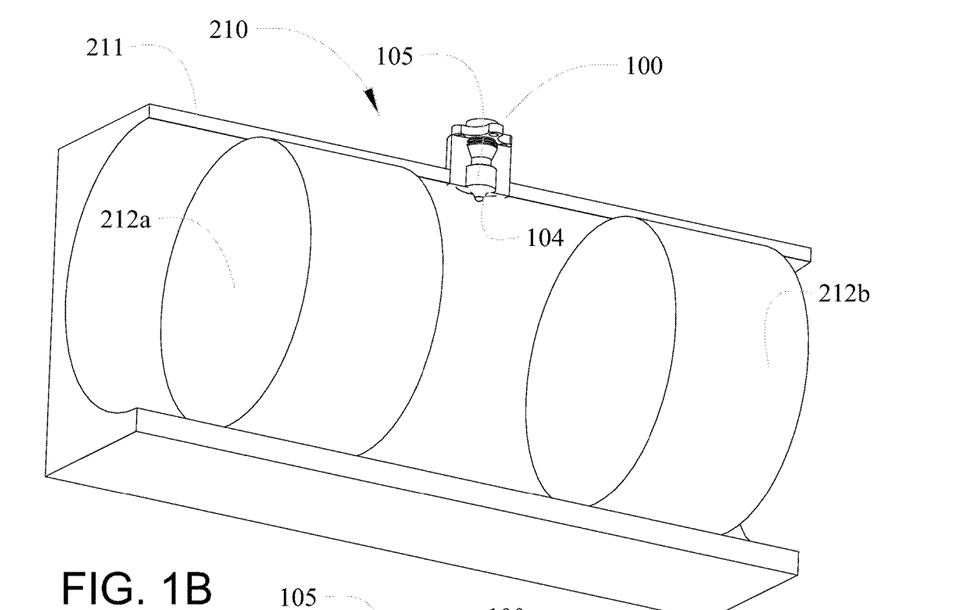
FIG. 1B is a partially sectioned pictorial view of an alternative embodiment as incorporated in an opposing piston engine.

Alternative engine structures may also be employed with the conditioner and injector device 100. As a second example an opposed piston engine 210 is shown in FIG. 1B. Opposing pistons 212a and 212b operate in mutual reciprocating motion in a cylinder 211. Connecting rods and other elements of the engine are known in the art and are not shown in detail in the drawings. The conditioner and injector device 100 is carried in the structure surrounding the cylinder 211 to allow the exterior wall 104 of the vessel 105 to be exposed within the central portion of the cylinder which constitutes the combustion chamber. Operation of the conditioner and injector device is substantially identical as for the embodiment described with respect to FIG. 1A.

Figure 1C:
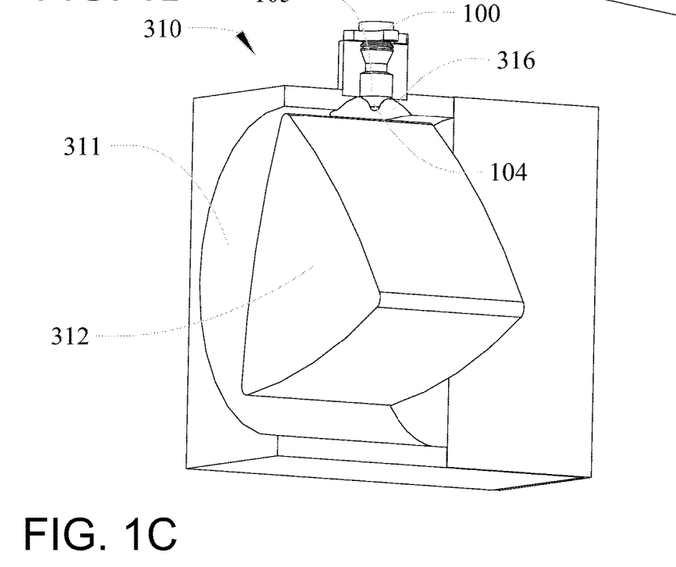
FIG. 1C is a partially sectioned pictorial view of an alternative embodiment incorporated in a rotary engine.

Similarly, the conditioner injector device 100 may be employed in a rotary engine 310 as illustrated in FIG. 1C. The conditioner and injector device 100 is carried in the structure surrounding the engine operating chamber 311 in which rotor 312 circulates to allow the exterior wall 104 of the vessel 105 to be exposed within a recess 316 for communication with that portion of the operating chamber which constitutes the combustion chamber during rotation of the rotor 312.

Embodiments of the conditioner and injector device 100 may also be employed in dynamic cam, wobble plate or axial engine formats. For the operating disclosure herein the term cylinder head as applicable to a conventional piston engine is intended to include comparable structure surrounding the combustion chamber in alternative engine formats. Similarly, the crank shaft as applicable to a conventional piston engine is intended to include the main operating shaft or other similar main power transmission element receiving power from the operating elements such as the piston or rotor and references to rotational positions of the crank shaft are intended to represent comparative portion of the compression and combustion cycle in alternative engine forms.

An exemplary embodiment of an engine employing the fuel conditioner and injector device for the engine of FIG. 1A incorporates one cylinder with a swept volume of 600 cc having 96 mm bore and 82 mm stroke. Engine fuel type is 103 octane gasoline. During operation cylinder pressures for the exemplary embodiment reach a maximum of approximately 3.59 MPa (520 psi) during the compression cycle. Temperatures generated by the combusting fuel/air charge reach approximately 4,000° F. The engine has a maximum operating condition of 7,000 RPM employing a fuel charge of 3.0 cubic mm ($10^{-3}$ ml). Heating of the vessel 105 by the cylinder combustion to at least 1000° F. is desirable with approximately 2,500° F. being reached with the engine operating at maximum RPM with full fuel charge. Volume of the expansion chamber 103 in the vessel 105 is larger than the volume of injected liquid fuel and for the exemplary embodiment is 1766 cubic mm (1.766 cc) in the exemplary embodiment to accommodate the 3.0 cubic mm liquid fuel volume for injection and provide sufficient volume for adiabatic pressurization of the fuel charge for injection. The surface area of the wall 104 of the vessel 105 is 440 mm$^2$ to provide the necessary heat transfer from the combustion chamber to the expansion chamber 103 to achieve the adiabatic conditioning of the fuel beyond the critical point. The fuel delivery system providing liquid fuel to the fuel inlet passage 113a operates in the exemplary engine at 24.1 MPa (3500 psi) A minimum operating pressure of the fuel delivery system of at least 4 MPa (580 psi) (approximately 12% over maximum cylinder compression pressure) is desirable and exemplary systems may operate at between 4.13 MPa (600 psi) and the present example operating pressure of 24.1 MPa. The liquid fuel inlet nozzle 114 sealed by pin 109 has a diameter of 0.4 mm for the exemplary embodiment to achieve injection of the liquid fuel within the desire time delay. Operation of the pin 109 may be accomplished by electromechanical components in the upper portion 101 of the conditioner and injector device 100 such as a solenoid or piezo element operated by a microcomputer controller to achieve desired opening and closing of the liquid fuel inlet nozzle 114 by the pin 109. Six open fuel injection passages 111 from the expansion chamber 103 in the vessel 105, each with a diameter of 0.22 mm, are employed in the exemplary embodiment giving a total area of 0.23 mm$^2$. This area is optimized for the exemplary embodiment to allow oxidizer charge admission into the expansion chamber 103 during the compression cycle for creating radicals in the fuel during conditioning to create a hyper fuel state and to allow injection of the conditioned fuel over the desired time period for combustion as described in detail below.

Operation of the engine is best described in terms of timing based on rotation of the crank shaft. Operating at 7,000 RPM, the crank shaft transits 1° of angular rotation in 23.8 microseconds. For maximum efficiency, combustion of the fuel charge occurs over a desired range between 20° and approximately 50° after TDC. This results in a desired combustion time of 714 microseconds. Fuel introduced into the expansion chamber 103 must have sufficient time to expand and pressurize with resulting injection through the fuel injection passages and timing must accommodate ignition delay. Projected combustion maximum pressures occur at approximately 30° after TDC. Adiabatic pressurization of the fuel charge in the expansion volume provides a peak injection pressure which then decays during injection of the conditioned fuel into the cylinder. The volume of the expansion chamber is designed to be much greater then volume of the injected fuel. The pressure in the expansion chamber from adiabatic expansion of injected fuel absorbing heat and partially oxidizing (as will be described subsequently) depends also on the expansion chamber volume. A smaller volume of the expansion chamber and higher temperature creates higher peak pressure in the expansion chamber and also will reduce the time of the fuel injection into combustion chamber, which will reduce combustion time. Sizing of the expansion chamber 103 is determined to create the desired pressure and temperature above the critical point for the fuel with the projected combustion rate.

Based on the structure described for the exemplary embodiment, the injection time of the liquid fuel injection into expansion chamber 103 calculated based on operating pressure of the fuel supply system, the amount of maximum fuel volume of 3 cubic mm, size of the liquid fuel inlet nozzle 114 and fuel environmental temperature is approximately 119 microseconds, which equals around 5° rotation of the crankshaft at 7,000 RPM. It should be noted that the injection time into expansion chamber (119 microseconds) must be less than a delay time of the increasing pressure in the expansion chamber to the equal the pressure supply system for preventing back flow of the fuel and sizing of the fuel inlet nozzle is determined to allow completion of the liquid fuel injection within that constraint. The injector nozzle pin 109 must be closed to seal the liquid fuel inlet nozzle 114 before of the pressure in the expansion chamber exceeds the fuel supply delivery pressure. In the exemplary embodiment expansion of the fuel charge takes approximately 345 microseconds to increase to 3.59 MPa (520 psi). The 119 microseconds of the injection time for the liquid fuel into expansion chamber therefore avoids any backflow of fuel from the expansion chamber into the fuel supply system. Within the 345 microseconds, the fuel charge is conditioned above the critical point and creation of radicals to provide the hyper fuel state occurs within approximately the last 60 microseconds (2.5° of crank rotation)

Figure 6:
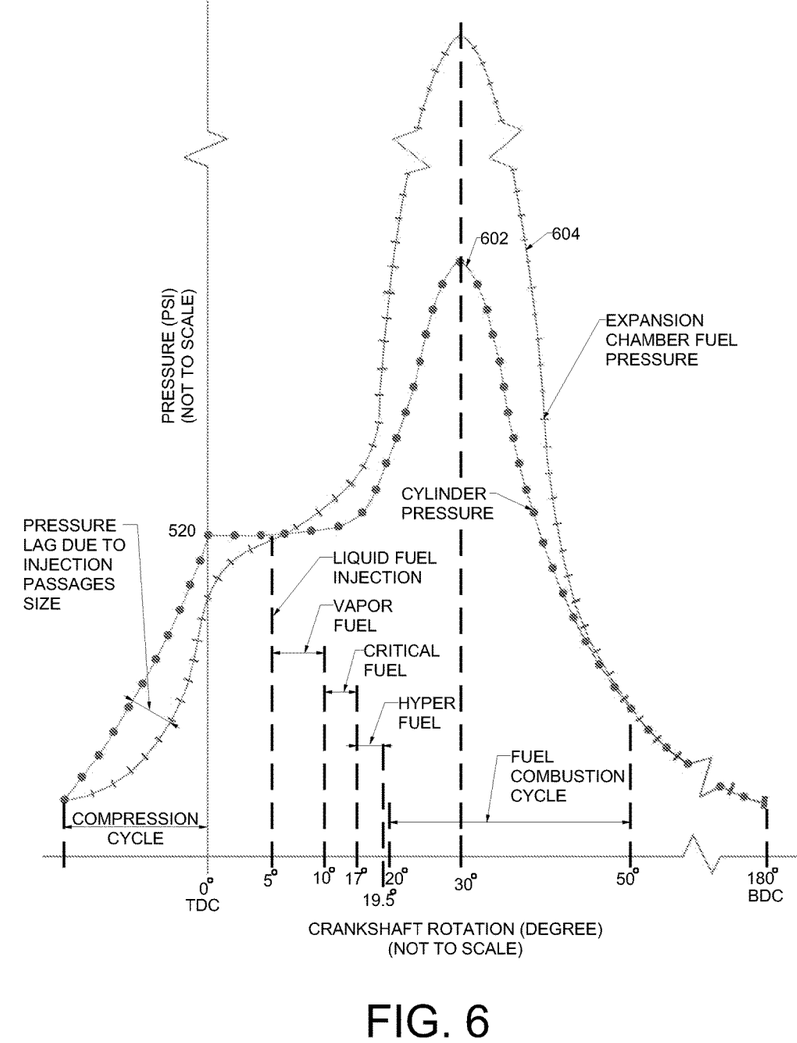
FIG. 6 is a graph showing pressure in the cylinder of the engine and the expansion chamber of the fuel conditioner and injector device; and, FIG. 7 is a block diagram of the controller and operator for the fuel injection pin.

When the pressure in the expansion chamber exceeds the 3.59 MPa (520 psi) threshold equal to compression pressure of the oxidizer charge in the engine, "self-injection" of conditioned fuel automatically commences through the open fuel injection passages 111 from the expansion chamber 103 into the combustion chamber 16. To accommodate the delay time, 345 microseconds, for the fuel charge to expand and pressurize in the expansion chamber for initiating injection, opening of the injection nozzle pin 109 must occur 15° prior to the desired commencement of combustion starting point at 20° after TDC. Additionally, a combustion delay of approximately 12 microseconds or approximately 0.5° of crankshaft rotation must be accommodated. Liquid fuel injection into the expansion chamber is previously noted as 119 microseconds or 5° of rotation which occurs within the 14.5° required for the fuel charge pressurization to 3.59 MPa (520 psi). Therefore, in the exemplary embodiment, initiation of the liquid fuel injection by opening of the injection nozzle pin 109 must occur at approximately 5° after TDC. FIG. 6 demonstrates the pressures in the engine cylinder, trace 602 and expansion chamber, trace 604 over the operating cycle of the piston as described above. Area of the open fuel injection passages is determined to create a combustion rate providing the desired fuel combustion cycle between 20° and 50° of crankshaft rotation in the example engine.

The open fuel injection passages 111 provide an additional benefit in that during the compression cycle of the oxidizer charge, compressed oxidizer is forced through the passages into the expansion chamber 103 to provide oxygen for creation of radicals in the fuel charge as the fuel is injected into the expansion chamber and is adiabatically pressurized and conditioned to a state above the critical point for the fuel. The oxidizer charge in a conventional engine may be pressurized air but may include injected nitrous oxide or other additive for enhanced performance. The total opening of the passages which communicate between the expansion chamber and the combustion chamber is determined such that a desired amount of compressed oxidizer is introduced from cylinder during the compression cycle. Partial oxidation of the fuel injected into expansion chamber will energize the fuel by creating molecules in radical formation therein without diluting fuel energy, which would lower the combustion efficiency. This operation allows the exemplary embodiment of the engine to operate as an injection ignition engine wherein the ignition and following combustion occurs from oxidizing of heated fuel to a state above a critical point in high concentration of oxygen, and that combustion event is independent of temperature of the oxidizer. This method of operation also greatly reduces or completely illuminates carbon coke formation of the fuel which has been conditioned to hyper fuel with molecules in radical formation, which may cause clogging injector nozzles and fuel passages. The introduction of fuel radicals into oxidizer present in the combustion chamber occurs substantially immediately upon fuel activation and transformation into the radical state, which prevents carbon coke formation.

For engine operation at the medium and lower RPM, all fuel injection requirements described above are adjusted automatically for normal operation of the engine. Because the engine operates from regulated amount of the injected fuel, a lower fuel volume results in less combustion temperature, a lower volume of oxidizer injected into expansion chamber, less heat transfer to the fuel and less pressure in the expansion chamber, lower engine RPM with more combustion time at approximately the same desire range between 20° and 50° of crankshaft rotation for the combustion process to maintain the combustion maximum pressure at 30°.

For the exemplary embodiment, cold start conditions of the engine may be accommodated by a cold start fuel injector 17 and glow plug 18 as seen in FIG. 1 to allow temperature stabilization of the engine for conditioning of the vessel 105 to provide appropriate temperatures for heating and expanding fuel in the expansion chamber 103. Alternatively electrical coils (not shown) may be placed inside the expansion chamber 103 to augment the heating capability of the vessel 105.

Figure 7:
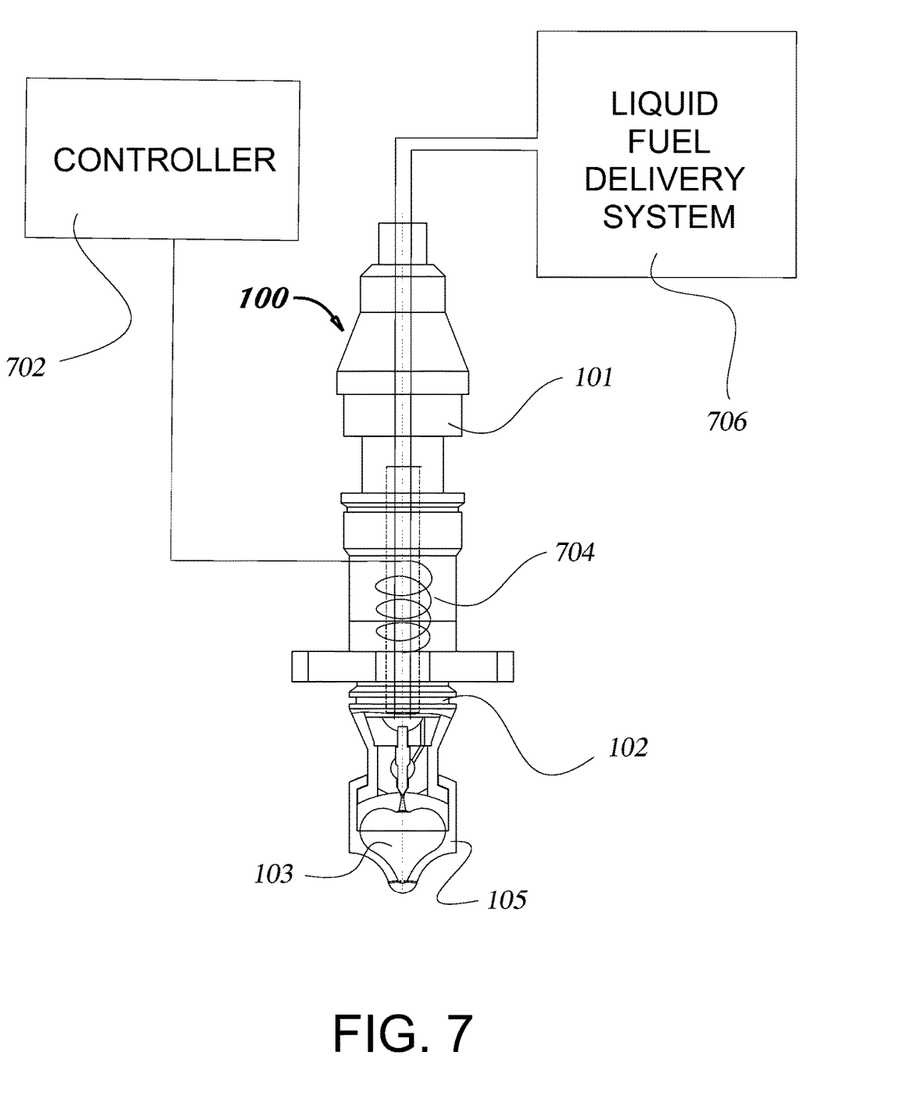

As seen in FIG. 7, an engine controller 702 provides timing control for the injection of fuel into the expansion chamber 103 by the pin 109. The engine controller is operable connected to an electromechanical operator 704 such as a solenoid or piezo actuator in the upper portion 101 of the fuel conditioner and injector 100. Upon powering of the operator 704, pin 109 is displaced from the seat 115 to open the nozzle 114 allowing liquid fuel from the pressurized liquid fuel supply system 706 connected through the gallery 113b through fuel passage 113a to be injected from the injection volume 113c into the expansion chamber 103 (as previously described with respect to FIG. 5). While described herein as an electromechanical operator, a purely mechanical actuation system may be employed.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fuel conditioner and injector for internal combustion engines comprising:
   a vessel having a wall extending into and exposed within a combustion chamber in an engine cylinder to be heated by combusting fuel, said vessel encompassing an expansion chamber and having at least one open fuel injection passage through the wall into said combustion chamber, said open fuel injection passage sized for introduction of less than a stoichiometric oxidizer volume during a compression stroke of a piston in the cylinder;
   an inlet conduit receiving liquid fuel at a predetermined pressure from a fuel delivery system;
   a nozzle interconnecting the inlet conduit and the expansion chamber;
   a pin operably sealing the nozzle for timed injection of liquid fuel into the expansion chamber;
   an operator responsive to a controller, said operator actuating the pin from a closed position sealing the nozzle to an open position placing the fuel injection volume in fluid communication with the expansion chamber injecting the liquid fuel responsive to a first signal and returning the pin from the open position to the closed position responsive to a second signal;

said controller adapted to issue said first signal at a predetermined time less than a delay time of increasing pressure of the injected fuel by adiabatic conditioning in the expansion chamber using heat in the vessel wall to equal pressure in the inlet conduit, whereupon said controller issues said second signal, said vessel and expansion chamber adapted to further adiabatically condition introduced fuel to a state above a critical point using heat in the vessel wall, the conditioned fuel self-injecting through the at least one open fuel injection passage.

2. The fuel conditioner and injector for internal combustion engines as defined in claim 1, the fuel delivery system adapted to maintain a liquid fuel pressure of at least 12% greater than a maximum compression pressure in the engine.

3. The fuel conditioner and injector for internal combustion engines as defined in claim 2, said maximum compression pressure in the engine is a maximum of 3.59 MPa and said liquid fuel pressure is at least 4 MPa.

4. The fuel conditioner and injector for internal combustion engines as defined in claim 1 wherein the vessel comprises a cone shaped lower portion and a torus shaped cap, said lower portion incorporating the wall exposed within the combustion chamber and said cap incorporating the nozzle.

5. The fuel conditioner and injector for internal combustion engines as defined in claim 4 wherein the nozzle incorporates a seat for sealing engagement of the pin.

6. The fuel condition and injector for internal combustion engines as defined in claim 1 the at least one open fuel injection passage sized for introduction of a pressurized oxidizer charge through the at least one open fuel passage from the combustion chamber during a compression cycle of the engine whereby the fuel is partially oxidized to form radicals in molecules in a portion of the fuel to produce a hyper fuel state.

7. The fuel conditioner and injector for internal combustion engines as defined in claim 6 said wall of the vessel adapted to provide heat to induce a higher energy state in the fuel by heating above the critical point whereby partial oxidation releases fuel internal energy in the hyper fuel state.

8. The fuel conditioner and injector for internal combustion engines as defined in claim 6 said open fuel injection passage sized whereby up to 5% of a fuel charge is converted with radical molecules in the hyper fuel state.

9. The fuel conditioner and injector for internal combustion engines as defined in claim 1 wherein a volume of the expansion chamber is greater than a volume of the liquid fuel injected into the expansion chamber.

10. The fuel conditioner and injector for internal combustion engines as defined in claim 1 wherein the vessel is centrally positioned with respect to the combustion chamber.

11. An internal combustion engine comprising:
a cylinder housing a piston for reciprocating motion;
a cylinder head enclosing the cylinder and having a combustion chamber;
a fuel conditioner and injector incorporating a vessel having a wall exposed within the combustion chamber to be heated by combusting fuel, said vessel encompassing an expansion chamber and having at least one open fuel injection passage through the wall into the combustion chamber, said open fuel injection passage sized for introduction of less than a stoichiometric oxidizer volume during a compression stroke of a piston in the cylinder;
an inlet conduit receiving liquid fuel at a predetermined pressure from a fuel delivery system;
a nozzle interconnecting the inlet conduit and the expansion chamber;
a pin operably sealing the nozzle for timed injection of liquid fuel into the expansion chamber;
an electromechanical operator adapted to actuate the pin from a closed position sealing the nozzle to an open position placing the fuel injection volume in fluid communication with the expansion chamber at a predetermined time less than a delay time of increasing pressure of injected fuel by adiabatic conditioning in the expansion chamber using heat in the vessel wall to equal pressure in the inlet conduit and then returning the pin from the open position to the closed position, said vessel and expansion chamber adapted to further adiabatically condition the injected fuel to a state above a critical point using heat absorbed from the vessel wall, and partially oxidized to form radicals in molecules in a portion of the fuel using a pressurized oxidizer charge introduced through the open fuel passages from a compression cycle in the engine to produce a hyper fuel state, the conditioned fuel self-injecting through the at least one open fuel injection passage into the combustion chamber of the engine.

12. The combustion engine as defined in claim 11, the fuel delivery system adapted to maintain a liquid fuel pressure of at least 12% greater than a maximum compression pressure in the engine.

13. The internal combustion engine as defined in claim 12, said maximum compression pressure in the cylinder is a maximum of 3.59 MPa and the liquid fuel pressure is at least 4 MPa.

14. The internal combustion engine as defined in claim 12 wherein the at least one open fuel injection passage has a predetermined area to admit a charge of oxidizer under compression pressure in the cylinder to induce radical formation in up to 5% of a fuel charge.

15. The internal combustion engine as defined in claim 12 wherein the operator actuates the pin to the open position at a predetermined rotation of a main operating shaft in the engine whereby liquid fuel injected into the expansion chamber is conditioned, self-injecting through the at least one open fuel injection passage into the combustion chamber to combust over a desired range of rotation of the main operating shaft.

16. The fuel conditioner and injector for internal combustion engines as defined in claim 15 wherein the at least one open fuel injection passage has a predetermined area to inject conditioned fuel over a time period of a combustion cycle between 200 and 500 of main operating shaft rotation after top dead center of the piston.

17. The internal combustion engine as defined in claim 15 wherein the at least one fuel injection passage comprises a plurality of fuel injection passages.

* * * * *